(12) United States Patent
Nakatsu

(10) Patent No.: US 10,223,928 B2
(45) Date of Patent: Mar. 5, 2019

(54) INFORMATION PROCESSING APPARATUS, INFORMATION PROCESSING METHOD

(71) Applicant: KYOCERA Document Solutions Inc., Osaka-shi, Osaka (JP)

(72) Inventor: Kenta Nakatsu, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 450 days.

(21) Appl. No.: 15/047,410

(22) Filed: Feb. 18, 2016

(65) Prior Publication Data

US 2016/0247408 A1 Aug. 25, 2016

(30) Foreign Application Priority Data

Feb. 20, 2015 (JP) ................. 2015-032051

(51) Int. Cl.
*G06F 13/00* (2006.01)
*G09B 5/02* (2006.01)
*G06F 3/14* (2006.01)

(52) U.S. Cl.
CPC .............. *G09B 5/02* (2013.01); *G06F 3/1454* (2013.01)

(58) Field of Classification Search
CPC .................................. G09B 5/00; G06Q 10/00
See application file for complete search history.

(56) References Cited

U.S. PATENT DOCUMENTS

2016/0117953 A1* 4/2016 Lluch ....................... G09B 5/02
434/188

FOREIGN PATENT DOCUMENTS

JP 2013003280 A 1/2013

* cited by examiner

*Primary Examiner* — Reginald Renwick
(74) *Attorney, Agent, or Firm* — Alleman Hall Creasman & Tuttle LLP

(57) ABSTRACT

An information processing apparatus includes a first storage portion, a second storage portion, a board-written data obtaining portion, a storage processing portion, and a first data processing portion. The first storage portion stores one or more pieces of board-written data which each includes lesson information that was input to a board surface. The second storage portion stores one or more pieces of exercise data. The board-written data obtaining portion obtains a piece of board-written data. The storage processing portion stores, in the first storage portion, the piece of board-written data obtained by the board-written data obtaining portion. The first data processing portion associates the piece of board-written data stored in the first storage portion by the storage processing portion, with a piece of exercise data whose learning theme is common to a learning theme of lesson information included in the piece of board-written data.

5 Claims, 9 Drawing Sheets

INFORMATION PROCESSING APPARATUS, INFORMATION PROCESSING METHOD

INCORPORATION BY REFERENCE

This application is based upon and claims the benefit of priority from the corresponding Japanese Patent Application No. 2015-032051 filed on Feb. 20, 2015, the entire contents of which are incorporated herein by reference.

BACKGROUND

The present disclosure relates to an information processing apparatus and an information processing method that is executed in the information processing apparatus.

At the site of education such as a school, a lesson may be conducted by using an interactive whiteboard and tablet terminals. The interactive whiteboard is configured to obtain, as board-written data, information (hereinafter referred to as "lesson information") such as characters and graphics written by the teacher on a board surface during the lesson. Terminal apparatuses such as tablet terminals are distributed to and used by the students. For example, the terminal apparatuses may obtain an electronic teaching material which has been digitized from a teaching material such as a textbook, from a server, and display the obtained electronic teaching material on the displays of the terminal apparatuses. This enables the students to refer to the electronic teaching material displayed on the terminal apparatuses during the lesson. On the other hand, the interactive whiteboard periodically obtains, as the board-written data, the lesson information written on the board surface by the teacher during the lesson, and stores the obtained board-written data in the server. The board-written data stored in the server is used by the teacher to improve the lesson content, or used by the students to review the lesson.

In addition, during a lesson in which an interactive whiteboard and terminal apparatuses are used, exercise data may be transmitted from the server to the terminal apparatuses, wherein the exercise data is digitized exercises created in accordance with the lesson content. This enables the students to answer the exercises given by the teacher, by using the terminal apparatuses. The exercise data stored in the server can be transmitted to the terminal apparatuses from the server in response to requests from the terminal apparatuses used by the students, without being limited to during lessons.

SUMMARY

An information processing apparatus according to an aspect of the present disclosure includes a first storage portion, a second storage portion, a board-written data obtaining portion, a storage processing portion, and a first data processing portion. The first storage portion is configured to store one or more pieces of board-written data which each includes lesson information that was input to a board surface. The second storage portion is configured to store one or more pieces of exercise data. The board-written data obtaining portion is configured to obtain a piece of board-written data. The storage processing portion is configured to store, in the first storage portion, the piece of board-written data obtained by the board-written data obtaining portion. The first data processing portion is configured to associate the piece of board-written data stored in the first storage portion by the storage processing portion, with a piece of exercise data whose learning theme is common to a learning theme of lesson information included in the piece of board-written data.

An information processing method according to another aspect of the present disclosure is performed in an information processing apparatus which includes a first storage portion and a second storage portion, the first storage portion being configured to store one or more pieces of board-written data which each includes lesson information that was input to a board surface, the second storage portion being configured to store one or more pieces of exercise data. The information processing method includes the following steps. In a first step, a piece of board-written data is obtained. In a second step, the piece of board-written data obtained in the first step is stored in the first storage portion. In a third step, the piece of board-written data stored in the first storage portion in the second step is associated with a piece of exercise data whose learning theme is common to a learning theme of lesson information included in the piece of board-written data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the drawings. It should be noted that the following embodiment is an example of a specific embodiment of the present disclosure and should not limit the technical scope of the present disclosure.

[Information Processing System 100]

First, the configuration of an information processing system 100 according to an embodiment of the present disclosure is described with reference to FIG. 1. Here, FIG. 1 is a block diagram showing the configuration of the information processing system 100.

Figure 1:
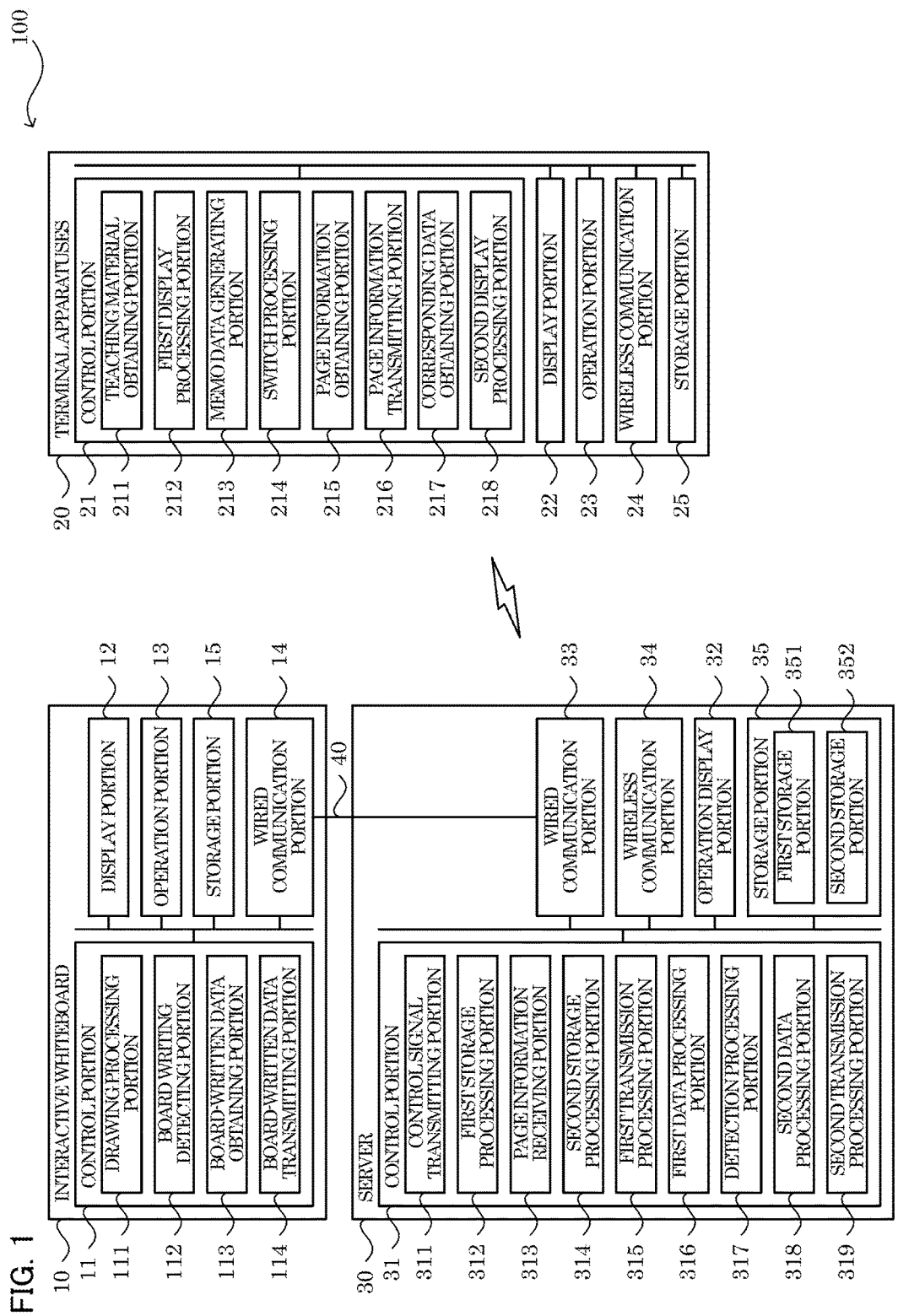
FIG. 1 is a diagram showing the configuration of an information processing system according to an embodiment of the present disclosure.

As shown in FIG. 1, the information processing system 100 includes an interactive whiteboard 10, one or more terminal apparatuses 20, and a server 30. The interactive whiteboard 10 and the server 30 are connected via a communication network 40 such as the Internet or a LAN, and can perform wired data communications with each other. The terminal apparatuses 20 and the server 30 can perform wireless data communications with each other. It is noted that the interactive whiteboard 10 and the server 30 may be able to perform wireless data communications with each other. In addition, the terminal apparatuses 20 and the server 30 may be connected via the communication network 40. Here, the interactive whiteboard 10 and the server 30 are an example of the information processing apparatus of the present disclosure. It is noted that the present disclosure can also be realized by the information processing system 100 in which the server 30 is omitted and the components of the server 30 are included in the interactive whiteboard 10.

[Interactive Whiteboard 10]

Figure 2:
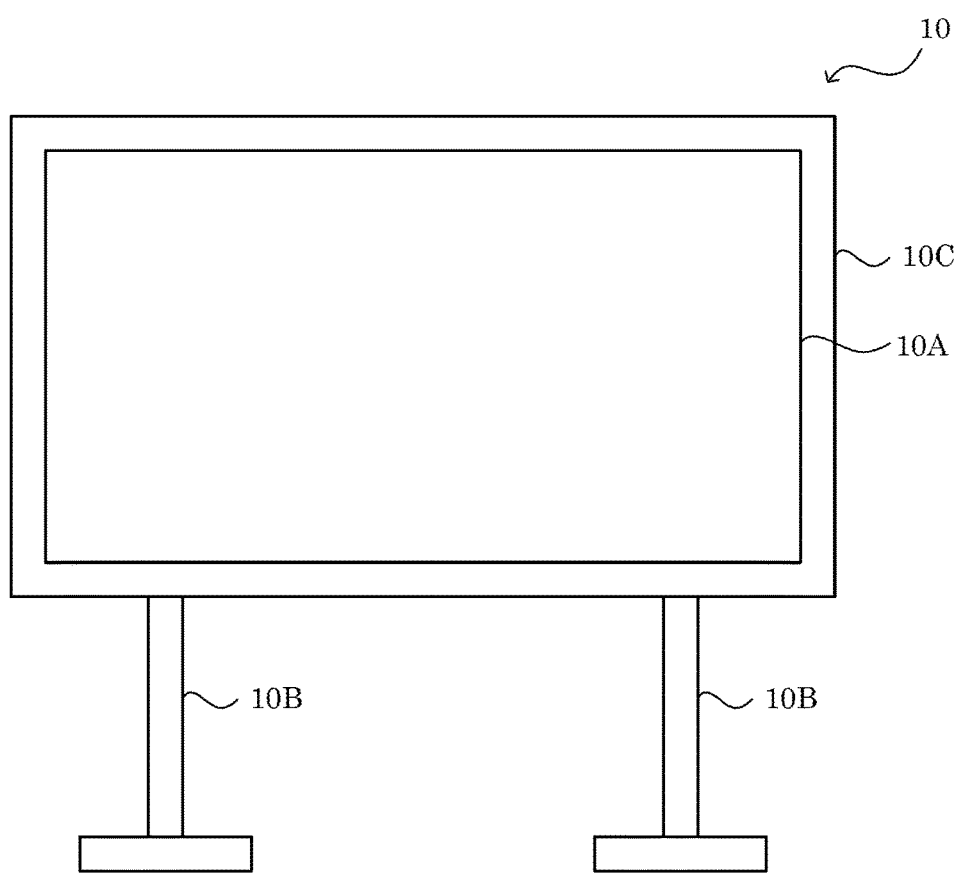
FIG. 2 is a diagram showing the configuration of an interactive whiteboard included in the information processing system according to an embodiment of the present disclosure.

Next, the configuration of the interactive whiteboard 10 is described with reference to FIG. 1 and FIG. 2. Here, FIG. 2 is a schematic diagram showing the configuration of the interactive whiteboard 10.

The interactive whiteboard 10 is configured to obtain, as board-written data, information (hereinafter referred to as "lesson information") such as characters and graphics written on a board surface 10A shown in FIG. 2. As shown in FIG. 2, the outer circumference of the board surface 10A is surrounded by a frame 10C that is supported by leg portions 10B.

Specifically, as shown in FIG. 1, the interactive whiteboard 10 includes a control portion 11, a display portion 12, an operation portion 13, a wired communication portion 14, and a storage portion 15.

The control portion 11 includes control equipment such as CPU, ROM, and RAM that are not shown. The CPU is a processor that executes various calculation processes. The ROM is a nonvolatile storage medium in which various information such as control programs for causing the CPU to execute various processes are stored in advance. The RAM is a volatile storage medium, and is used as a temporary storage memory (working area) for the various processes executed by the CPU. In the control portion 11, the CPU executes the various control programs stored in advance in the ROM or the like. This allows the interactive whiteboard 10 to be controlled comprehensively by the control portion 11.

The display portion 12 displays various types of information on the board surface 10A based on control instructions from the control portion 11. That is, the board surface 10A is a display surface of the display portion 12. For example, the display portion 12 is a liquid crystal display.

The operation portion 13 inputs various types of information to the control portion 11 in response to user operations performed on the board surface 10A. For example, the operation portion 13 is a touch panel provided on the board surface 10A.

The wired communication portion 14 is a communication interface that can perform a wired data communication with an external communication apparatus such as the server 30 via the communication network 40.

The storage portion 15 is a storage device such as SSD (Solid State Drive) or HDD (Hard Disk Drive). It is noted that the storage portion 15 may be the RAM of the control portion 11.

A board-written data obtaining program is stored in the storage portion 15 in advance, wherein the board-written data obtaining program causes the CPU of the control portion 11 to execute a board-written data obtaining process (see the flowchart of FIG. 6) that is described below. It is noted that the board-written data obtaining program may be recorded on a computer-readable recording medium such as a CD, a DVD, or a flash memory, and may be installed from the recording medium to the storage portion 15.

As shown in FIG. 1, the control portion 11 includes a drawing processing portion 111, a board writing detecting portion 112, a board-written data obtaining portion 113, and a board-written data transmitting portion 114. Specifically, the CPU of the control portion 11 executes the board-written data obtaining program stored in the storage portion 15. This allows the control portion 11 to function as the drawing processing portion 111, the board writing detecting portion 112, the board-written data obtaining portion 113, and the board-written data transmitting portion 114.

The drawing processing portion 111, in response to a signal that is input from the operation portion 13 in correspondence with a drawing operation performed on the board surface 10A, renders an image on the display portion 12 in correspondence with the drawing operation. This allows the lesson information such as the characters and graphics to be displayed on the board surface 10A.

The board writing detecting portion 112 detects whether or not there is board writing on the board surface 10A. That is, the board writing detecting portion 112 detects whether or not a lesson information input operation has been performed on the board surface 10A. Specifically, the board writing detecting portion 112 detects whether or not there is board writing on the board surface 10A, based on the signal that is input from the operation portion 13 in correspondence with the drawing operation performed on the board surface 10A.

The board-written data obtaining portion 113 obtains board-written data which includes lesson information that is input to the board surface 10A. Here, the lesson information is not limited to what is input to the board surface 10A by a drawing operation, but may be what is drawn and input to the board surface 10A by a physical means using a chalk or the like.

For example, the board-written data obtaining portion 113 may generate a screen shot of a display screen displayed on the board surface 10A by the display portion 12, and obtain the screen shot as the board-written data. It is noted that the board-written data obtaining portion 113 may generate difference data representing a difference between a current screen shot and a most recently generated screen shot, and obtain the difference data as the board-written data. In addition, the board-written data obtaining portion 113 may cause an image reading portion such as a scanner that can read an image on the board surface 10A, to read the lesson information input to the board surface 10A, and obtain the read image data as the board-written data.

Here, the board-written data obtaining portion 113 obtains the board-written data at predetermined timings. Specifically, the board-written data obtaining portion 113 obtains, as the board-written data, the lesson information that has been input to the board surface 10A, each time a predetermined time passes after the board writing detecting portion 112 detected absence of board writing. It is noted that the board-written data obtaining portion 113 may obtain the board-written data each time a predetermined operation is performed to the operation portion 13, or each time a predetermined time passes.

The board-written data transmitting portion 114 transmits, to the server 30, the board-written data obtained by the board-written data obtaining portion 113. The board-written data transmitted to the server 30 is stored in a storage portion 35 (see FIG. 1) of the server 30 which is described below.

Meanwhile, at the site of education such as a school, a lesson may be conducted by using the interactive whiteboard 10 and the terminal apparatuses 20. The terminal apparatuses 20 are distributed to and used by the students. For example, the terminal apparatuses 20 may obtain an electronic teaching material which has been digitized from a teaching material such as a textbook, from the server 30, and display the obtained electronic teaching material on display portions 22 (see FIG. 1) of the terminal apparatuses 20 that are described below. This enables the students to refer to the electronic teaching material displayed on the terminal apparatuses 20 during the lesson. On the other hand, the interactive whiteboard 10 periodically obtains, as the board-written data, the lesson information written on the board surface 10A by the teacher during the lesson, and stores the obtained board-written data in a storage portion 35 of the server 30. The board-written data stored in the storage portion 35 of the server 30 is, for example, used by the teacher to improve the lesson content, or used by the students to review the lesson.

In addition, during a lesson in which the interactive whiteboard 10 and the terminal apparatuses 20 are used, exercise data may be transmitted from the server 30 to the terminal apparatuses 20, wherein the exercise data is digitized exercises created in accordance with the lesson content. This enables the students to answer the exercises given by the teacher, by using the terminal apparatuses 20. The exercise data stored in the server 30 can be transmitted to the terminal apparatuses 20 from the server 30 in response to requests from the terminal apparatuses 20, without being limited to during lessons.

Here, in a case where a student reviews the lesson by using the exercise data stored in the server 30, it is preferable, from the viewpoint of improving the learning effects, that the student refers to one or more other pieces of exercise data whose learning theme is common to that of the exercise data. However, conventionally, it is troublesome for the students to detect, from among a lot of pieces of exercise data stored in the server 30, a piece of exercise data whose learning theme is common to that of another piece of exercise data, and it is difficult for the students to detect a desired piece of exercise data. On the other hand, in the information processing system 100 of the present disclosure, in a case where a lesson is conducted by using the interactive whiteboard 10 and the terminal apparatuses 20, it is possible to reduce the trouble that is caused when the students review the lesson.

The following describes the terminal apparatuses 20 and the server 30 with reference to FIG. 1.

[Terminal Apparatuses 20]

As shown in FIG. 1, the terminal apparatuses 20 is an information processing apparatus such as a tablet terminal including a control portion 21, a display portion 22, an operation portion 23, a wireless communication portion 24, and a storage portion 25. It is noted that the terminal apparatuses 20 may be a personal computer, a PDA, or a smartphone.

The control portion 21 includes control equipment such as CPU, ROM, and RAM that are not shown. The CPU is a processor that executes various calculation processes. The ROM is a nonvolatile storage medium in which various information such as control programs for causing the CPU to execute various processes are stored in advance. The RAM is a volatile storage medium, and is used as a temporary storage memory (working area) for the various processes executed by the CPU. In the control portion 21, the CPU executes the various control programs stored in advance in the ROM or the like. This allows the terminal apparatuses 20 to be controlled comprehensively by the control portion 21.

The display portion 22 displays various types of information based on control instructions from the control portion 21. For example, the display portion 22 is a liquid crystal display.

The operation portion 23 inputs various types of information to the control portion 21 in response to user operations. For example, the operation portion 23 is a touch panel provided on the display surface of the display portion 22 and can input various types of information to the control portion 21 based on user operations performed on the display surface.

The wireless communication portion 24 is a communication interface that can perform a wireless data communication with an external communication apparatus such as the server 30.

The storage portion 25 is a storage device such as SSD (Solid State Drive) or HDD (Hard Disk Drive). It is noted that the storage portion 25 may be the RAM of the control portion 21.

A page information obtaining program is stored in the storage portion 25 in advance, wherein the page information obtaining program causes the CPU of the control portion 21 to execute a page information obtaining process (see the flowchart of FIG. 7) and a lesson information display process (see the flowchart of FIG. 9) that are described below. It is noted that the page information obtaining program may be recorded on a computer-readable recording medium such as a CD, a DVD, or a flash memory, and may be installed from the recording medium to the storage portion 25.

As shown in FIG. 1, the control portion 21 includes a teaching material obtaining portion 211, a first display processing portion 212, a memo data generating portion 213, a switch processing portion 214, a page information obtaining portion 215, a page information transmitting portion 216, a corresponding data obtaining portion 217, and a second display processing portion 218. Specifically, the CPU of the control portion 21 executes the page information obtaining program stored in the storage portion 25. This allows the control portion 21 to function as the teaching material obtaining portion 211, the first display processing portion 212, the memo data generating portion 213, the switch processing portion 214, the page information obtaining portion 215, the page information transmitting portion 216, the corresponding data obtaining portion 217, and the second display processing portion 218.

The teaching material obtaining portion 211 obtains the electronic teaching material which has been digitized from a teaching material such as a textbook. The teaching material includes books such as textbooks, as well as prints and booklets in which learning items of the lesson and the like are described. The electronic teaching material is stored in the server 30 in advance. As one example, the teaching material obtaining portion 211 causes the server 30 to transmit the electronic teaching material by transmitting, to the server 30, an instruction to transmit the electronic teaching material. The teaching material obtaining portion 211 then receives and obtains the electronic teaching material transmitted from the server 30. It is noted that the electronic teaching material may be stored in the storage portion 25 in advance.

The first display processing portion 212 displays, on the display portion 22, the electronic teaching material obtained by the teaching material obtaining portion 211. Specifically, the first display processing portion 212 displays a predetermined page of the electronic teaching material on the display portion 22. For example, the first display processing portion 212 displays, on the display portion 22, a page of the electronic teaching material that has been set in the server 30 in advance based on the content of the lesson to be conducted using the information processing system 100.

The memo data generating portion 213 generates memo data representing a memo in response to a memo input operation performed on the page of the electronic teaching material displayed on the display portion 22. For example, the memo data generating portion 213, in response to a tap operation performed on the page of the electronic teaching material displayed on the display portion 22, displays, on the display portion 22, a memo input screen for performing a memo input operation. The memo data generating portion 213 then generates the memo data based on the memo input operation performed on the memo input screen.

The switch processing portion 214 switches the page of the electronic teaching material displayed on the display portion 22 in response to a switch operation performed to the operation portion 23. For example, the switch operation is a swipe operation performed on the display surface of the display portion 22.

The page information obtaining portion 215, in response to the switch operation, obtains page information that corresponds to the page of the electronic teaching material that had been displayed before being switched by the switch processing portion 214. In addition, the page information obtaining portion 215 obtains, together with the page information, the memo data generated by the memo data generating portion 213 which corresponds to the page of the electronic teaching material that had been displayed before being switched by the switch processing portion 214.

The page information transmitting portion 216 transmits, to the server 30, the page information and the memo data obtained by the page information obtaining portion 215. In addition, the page information transmitting portion 216 transmits identification information of the terminal apparatuses 20 to the server 30 together with the page information and the memo data.

The corresponding data obtaining portion 217 obtains one or more pieces of board-written data corresponding to the page of the electronic teaching material displayed on the display portion 22. In addition, the corresponding data obtaining portion 217 obtains, together with the board-written data, the memo data corresponding to the page of the electronic teaching material displayed on the display portion 22.

Specifically, the corresponding data obtaining portion 217 causes the server 30 to transmit the board-written data and the memo data corresponding to the page of the electronic teaching material by transmitting, to the server 30, a transmission instruction together with the identification information and the page information corresponding to the page of the electronic teaching material displayed on the display portion 22, the transmission instruction instructing to transmit the board-written data and the memo data corresponding to the page of the electronic teaching material. The corresponding data obtaining portion 217 then receives and obtains the board-written data and the memo data transmitted from the server 30.

The second display processing portion 218 displays the lesson information on the display portion 22 based on the board-written data obtained by the corresponding data obtaining portion 217. In addition, the second display processing portion 218 displays a memo together with the lesson information on the display portion 22 based on the memo data obtained by the corresponding data obtaining portion 217. For example, the second display processing portion 218 displays a thumbnail image representing the lesson information and the memo on the page of the electronic teaching material displayed on the display portion 22. It is noted that the second display processing portion 218 may display the lesson information and the memo in response to a predetermined operation such as a tap operation performed on the page of the electronic teaching material displayed on the display portion 22.

[Server 30]

As shown in FIG. 1, the server 30 is an information processing apparatus including a control portion 31, an operation display portion 32, a wired communication portion 33, a wireless communication portion 34, and a storage portion 35.

The control portion 31 includes control equipment such as CPU, ROM, and RAM that are not shown. The CPU is a processor that executes various calculation processes. The ROM is a nonvolatile storage medium in which various information such as control programs for causing the CPU to execute various processes are stored in advance. The RAM is a volatile storage medium, and is used as a temporary storage memory (working area) for the various processes executed by the CPU. In the control portion 31, the CPU executes the various control programs stored in advance in the ROM or the like. This allows the server 30 to be controlled comprehensively by the control portion 31.

The operation display portion 32 includes a display portion and an operation portion, wherein the display portion is a liquid crystal display or the like that displays various types of information based on control instructions from the control portion 31, and the operation portion includes, for example, a keyboard and a mouse for receiving various input operations of the user.

The wired communication portion 33 is a communication interface that can perform a wired data communication with an external communication apparatus such as the interactive whiteboard 10 via the communication network 40.

The wireless communication portion 34 is a communication interface that can perform a wireless data communication with external communication apparatuses such as the terminal apparatuses 20.

The storage portion 35 is a storage device such as SSD (Solid State Drive) or HDD (Hard Disk Drive). The electronic teaching material is stored in the storage portion 35 in advance. It is noted that the storage portion 35 may be the RAM of the control portion 31.

Here, as shown in FIG. 1, the storage portion 35 includes a first storage portion 351 and a second storage portion 352. For example, the first storage portion 351 and the second storage portion 352 are individual storage areas set in the storage portion 35. It is noted that the first storage portion 351 and the second storage portion 352 may be individual storage devices included in the storage portion 35. In addition, either or both of the first storage portion 351 and the second storage portion 352 may be external storage device(s) that can communicate with the server 30.

The first storage portion 351 stores the board-written data. The second storage portion 352 stores the exercise data. The exercise data is digitized exercises such as quizzes and homework created by the teacher in accordance with the lesson content. As one example, the exercise data may be transmitted to the server 30 from an external information processing device used by the teacher, and then stored in the second storage portion 352.

A page information storing program is stored in the storage portion 35 in advance, wherein the page information storing program causes the CPU of the control portion 31 to execute a page information storing process (see the flowchart of FIG. 3), a first transmission process (see the flowchart of FIG. 4), and a second transmission process (see the flowchart of FIG. 8) that are described below. It is noted that the page information storing program may be recorded on a computer-readable recording medium such as a CD, a DVD, or a flash memory, and may be installed from the recording medium to the storage portion 35.

As shown in FIG. 1, the control portion 31 includes a control signal transmitting portion 311, a first storage processing portion 312, a page information receiving portion 313, a second storage processing portion 314, a first transmission processing portion 315, a first data processing portion 316, a detection processing portion 317, a second data processing portion 318, and a second transmission processing portion 319. Specifically, the CPU of the control portion 31 executes the page information storing program stored in the storage portion 35. This allows the control portion 31 to function as the control signal transmitting portion 311, the first storage processing portion 312, the page information receiving portion 313, the second storage processing portion 314, the first transmission processing portion 315, the first data processing portion 316, the detection processing portion 317, the second data processing portion 318, and the second transmission processing portion 319.

The control signal transmitting portion 311 transmits, to the interactive whiteboard 10 and the terminal apparatuses 20, a first control signal that indicates the start of a lesson. Upon receiving the first control signal, the interactive whiteboard 10 and the terminal apparatuses 20 execute processes corresponding to the start of the lesson. Specifically, upon receiving the first control signal, the interactive whiteboard 10 executes a board-written data obtaining process that is described below, and the terminal apparatuses 20 execute a page information obtaining process that is described below.

The control signal transmitting portion 311 also transmits, to the interactive whiteboard 10 and the terminal apparatuses 20, a second control signal that indicates the end of the lesson. Upon receiving the second control signal, the interactive whiteboard 10 and the terminal apparatuses 20 end the processes that were started upon reception of the first control signal.

The first storage processing portion 312 receives the board-written data transmitted from the board-written data transmitting portion 114 of the interactive whiteboard 10, and stores the received board-written data in the first storage portion 351. Here, the first storage processing portion 312 is an example of the storage processing portion of the present disclosure.

The page information receiving portion 313 receives the page information transmitted from the page information transmitting portions 216 of the terminal apparatuses 20. In addition, the page information receiving portion 313 receives the identification information and the memo data that are transmitted together with the page information from the page information transmitting portions 216 of the terminal apparatuses 20.

The second storage processing portion 314 stores each piece of page information received by the page information receiving portion 313 into the storage portion 35 in association with one or more pieces of board-written data that had been received by the first storage processing portion 312 before that piece of page information was received by the page information receiving portion 313. Specifically, the second storage processing portion 314 stores, into the storage portion 35, each piece of page information in association with the one or more pieces of board-written data and in association with a terminal apparatus 20 which is identified by the identification information received by the page information receiving portion 313 together with that piece of page information. In addition, the second storage processing portion 314 stores memo data that was received by the page information receiving portion 313 together with each piece of page information, into the storage portion 35 in association with that piece of page information.

The first transmission processing portion 315, in response to a predetermined transmission operation, transmits the exercise data stored in the second storage portion 352, to one or more terminal apparatuses 20. For example, when an operation for instructing a transmission of exercise data stored in the second storage portion 352 to the terminal apparatuses 20 is input to the operation display portion 32, the first transmission processing portion 315 transmits the exercise data to the terminal apparatuses 20. Here, the operation input to the operation display portion 32 to instruct a transmission of the exercise data stored in the second storage portion 352 to the terminal apparatuses 20 is an example of the transmission operation.

It is noted that, upon receiving, from a terminal for teacher (not shown), exercise data and an instruction for transmitting the exercise data to the terminal apparatuses 20, the first transmission processing portion 315 may transmit the received exercise data to the terminal apparatuses 20 in accordance with the received instruction. That is, the transmission operation may be an operation input to the operation portion of the terminal for teacher, the operation instructing the terminal to transmit, to the server 30, exercise data and a transmission instruction instructing the server 30 to transmit the exercise data to the terminal apparatuses 20.

The first data processing portion 316 associates each piece of board-written data that is stored in the first storage portion 351 by the first storage processing portion 312, with exercise data whose learning theme is common to that of the lesson information included in that piece of board-written data. For example, the first data processing portion 316 associates board-written data with exercise data by adding associated-data information to both the board-written data and the exercise data, wherein the associated-data information indicates that the board-written data and the exercise data are associated with each other. In addition, for example, when the subject of the lesson conducted by the teacher is arithmetic, the learning theme is "multiplication", "division", "fraction" or the like.

Specifically, the first data processing portion 316 associates exercise data transmitted by the first transmission processing portion 315, with board-written data obtained by the board-written data obtaining portion 113 of the interactive whiteboard 10 during a predetermined time period until the transmission of the exercise data by the first transmission processing portion 315. For example, the predetermined time period is arbitrarily selected from a range of 10 seconds to 5 minutes. That is, based on the fact that the teacher would give an exercise in accordance with the content written on the board surface 10A of the interactive whiteboard 10, it is supposed in the information processing system 100 that a piece of board-written data obtained from the board surface 10A immediately before the transmission of a piece of exercise data includes a piece of lesson information whose learning theme is common to that of the transmitted piece of exercise data.

It is noted that, when storage of a piece of exercise data into the second storage portion 352 is made, the first data processing portion 316 may associate the piece of exercise data with one or more pieces of board-written data that have already been stored in the first storage portion 351. In addition, when storage of a piece of board-written data into the first storage portion 351 is made by the first storage processing portion 312, the first data processing portion 316 may associate the piece of board-written data with one or more pieces of exercise data that have already been stored in the second storage portion 352.

In addition, the first data processing portion 316 may execute an OCR process for recognizing characters included in a piece of board-written data and a piece of exercise data, and determine, based on the execution results of the OCR process, whether or not there is a common learning theme between the piece of board-written data and the piece of exercise data. For example, if one or more keywords that have been assigned to a learning theme in advance are detected in both of the piece of board-written data and the piece of exercise data, the first data processing portion 316 determines that the learning theme is common to the piece of board-written data and the piece of exercise data, wherein one or more keywords are assigned to each of a plurality of learning themes in advance. For example, keywords "numerator", "denominator" and the like are assigned to a learning theme "fraction". The keywords are stored in the storage portion 35 in advance.

The detection processing portion 317 detects, from the first storage portion 351, similar board-written data that resembles, in content of the lesson information, board-written data that has been associated with exercise data by the first data processing portion 316. For example, when one or more keywords are detected in both of a piece of board-written data that has been associated with exercise data by the first data processing portion 316, and another piece of board-written data that is stored in the first storage portion 351, the detection processing portion 317 determines that the two pieces of board-written data resemble each other in content of the lesson information.

The second data processing portion 318 associates exercise data that has been associated with the board-written data by the first data processing portion 316, with exercise data that has been associated with the similar board-written data detected by the detection processing portion 317.

The second transmission processing portion 319 transmits a piece of exercise data to a terminal apparatus 20 in response to a transmission request from the terminal apparatus 20, and transmits, to the terminal apparatus 20, similar-exercise information that indicates one or more pieces of exercise data whose learning theme is common to that of the exercise data. Specifically, the second transmission processing portion 319 identifies one or more pieces of exercise data that have been associated with a piece of exercise data that is to be transmitted in response to a transmission request, and generates similar-exercise information that indicates the identified one or more pieces of exercise data.

Next, a description is given of various processes executed in the information processing system 100, namely, the page information storing process, the first transmission process, and the second transmission process executed by the server 30, the board-written data obtaining process executed by the interactive whiteboard 10, and the page information obtaining process and the lesson information display process executed by the terminal apparatuses 20.

[Page Information Storing Process]

Figure 3:
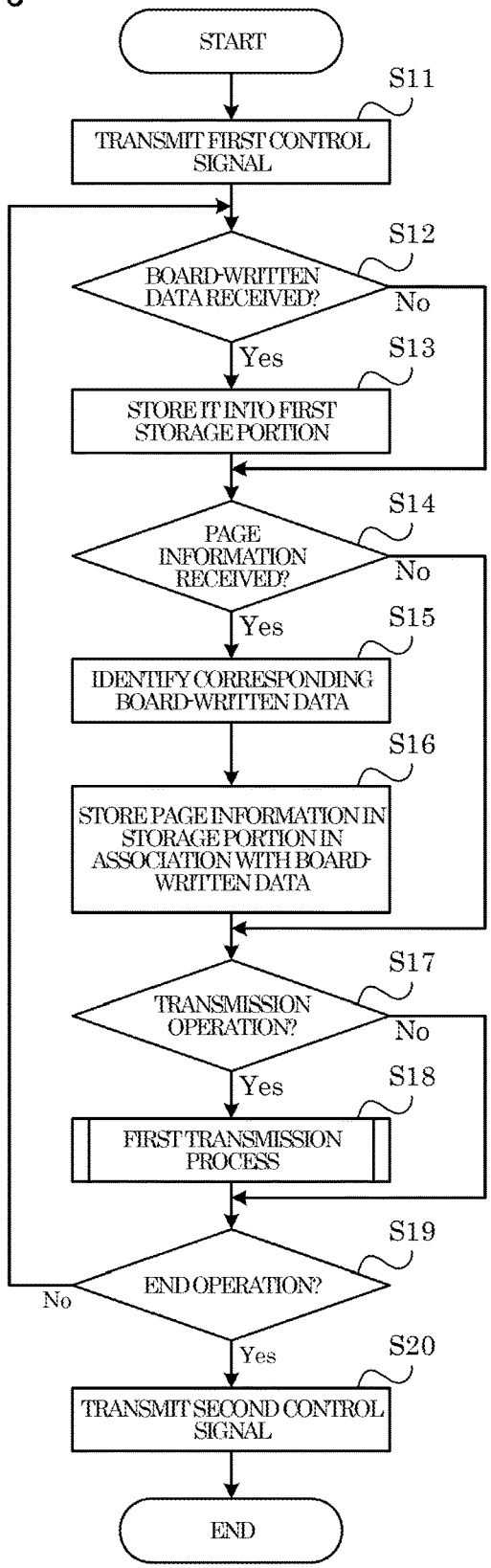
FIG. 3 is a flowchart showing an example of a page information storing process executed in a server included in the information processing system according to an embodiment of the present disclosure.

First, with reference to FIG. 3, a description is given of an example of the procedure of the page information storing process executed by the CPU of the control portion 31 in the server 30. Here, steps S11, S12, . . . represent numbers assigned to the processing procedures (steps) executed by the control portion 31. It is noted that the control portion 31 executes the page information storing process when an operation for instructing an execution of the page information storing process is performed on the operation display portion 32. For example, the operation for instructing an execution of the page information storing process is performed by a teacher when he/she starts a lesson.

<Step S11>

First, in step S11, the control portion 31 transmits the first control signal to the interactive whiteboard 10 and the terminal apparatuses 20. Here, the process of step S11 is executed by the control signal transmitting portion 311 of the control portion 31.

<Step S12>

In step S12, the control portion 31 determines whether or not the board-written data has been received from the interactive whiteboard 10.

Upon determining that the board-written data has been received from the interactive whiteboard 10 (Yes side at S12), the control portion 31 moves the process to step S13. In addition, upon determining that the board-written data has not been received from the interactive whiteboard 10 (No side at S12), the control portion 31 moves the process to step S14.

<Step S13>

In step S13, the control portion 31 stores the board-written data received in step S12, into the storage portion 35. Here, the process of step S13 is an example of the second step of the present disclosure and is executed by the first storage processing portion 312 of the control portion 31.

<Step S14>

In step S14, the control portion 31 determines whether or not the page information and the identification information have been received from the terminal apparatuses 20.

Here, upon determining that the page information and the identification information have been received from the terminal apparatuses 20 (Yes side at S14), the control portion 31 moves the process to step S15. In addition, upon determining that the page information and the identification information have not been received from the terminal apparatuses 20 (No side at S14), the control portion 31 moves the process to step S17. Here, the process of step S14 is executed by the page information receiving portion 313 of the control portion 31.

<Step S15>

In step S15, the control portion 31 identifies one or more pieces of board-written data that were stored in the storage portion 35 in step S13.

For example, the control portion 31 identifies, from among a plurality of pieces of board-written data stored in the storage portion 35, one or more pieces of board-written data that were stored in the storage portion 35 between the start of the page information storing process and the determination in step S14 that the page information and the identification information had been received.

<Step S16>

In step S16, the control portion 31 stores the page information determined in step S14 to have been received, into the storage portion 35 in association with the board-written data identified in step S15. For example, the control portion 31 associates the page information with the board-written data by attaching data identification information that identifies the board-written data identified in step S15, to the page information. Here, processes of step S15 and step S16 are executed by the second storage processing portion 314 of the control portion 31.

Here, the control portion 31 stores the page information into the storage portion 35 in association with the board-written data and in association with a terminal apparatus identified by the identification information that was determined in step S14 to have been received. In addition, if the memo data is determined in step S14 to have been received together with the page information, the control portion 31 stores the memo data in association with the page information, into the storage portion 35.

<Step S17>

In step S17, the control portion 31 determines whether or not a transmission operation for instructing a transmission of exercise data to the terminal apparatuses 20 was performed on the operation display portion 32.

Here, upon determining that the transmission operation was performed on the operation display portion 32 (Yes side at S17), the control portion 31 moves the process to step S18. In addition, upon determining that the transmission operation has not been performed on the operation display portion 32 (No side at S17), the control portion 31 moves the process to step S19.

<Step S18>

In step S18, the control portion 31 executes the first transmission process that is described below.

<Step S19>

In step S19, the control portion 31 determines whether or not an operation for ending the page information storing process was performed on the operation display portion 32.

Here, upon determining that the operation for ending the page information storing process was performed on the operation display portion 32 (Yes side at S19), the control portion 31 moves the process to step S20. In addition, upon determining that the operation for ending the page information storing process has not been performed on the operation display portion 32 (No side at S19), the control portion 31 moves the process to step S12. This allows the processes from step S12 to step S18 to be executed repeatedly until the operation for ending the page information storing process is performed. It is noted that in step S15 of the second round and after, the control portion 31 identifies, from among the plurality of pieces of board-written data stored in the first storage portion 351, one or more pieces of board-written data determined in step S12 to have been received between the preceding execution and the present execution of step S14.

<Step S20>

In step S20, the control portion 31 transmits the second control signal to the interactive whiteboard 10 and the terminal apparatuses 20. Here, the process of step S20 is executed by the control signal transmitting portion 311 of the control portion 31.

[First Transmission Process]

Figure 4:
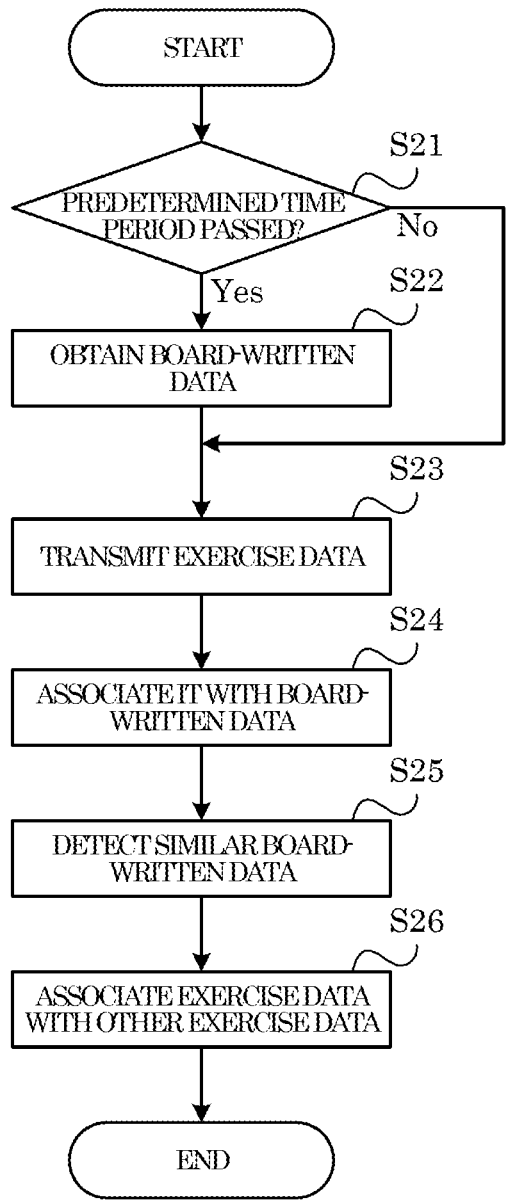
FIG. 4 is a flowchart showing an example of a first transmission process executed in the server included in the information processing system according to an embodiment of the present disclosure.

Next, with reference to FIG. 4, a description is given of an example of the procedure of the first transmission process executed by the CPU of the control portion 31 in the server 30. It is noted that the control portion 31 executes the first transmission process in step S18 of the page information storing process.

<Step S21>

In step S21, the control portion 31 determines whether or not a predetermined time period has passed from the time when a latest stored piece of board-written data in the first storage portion 351 was obtained in the interactive whiteboard 10.

Here, upon determining that the predetermined time period has passed from the time when the latest stored piece of board-written data in the first storage portion 351 was obtained in the interactive whiteboard 10 (Yes side at S21), the control portion 31 moves the process to step S22. In addition, upon determining that the predetermined time period has not passed from the time when the latest stored piece of board-written data in the first storage portion 351 was obtained in the interactive whiteboard 10 (No side at S21), the control portion 31 moves the process to step S23.

<Step S22>

In step S22, the control portion 31 obtains board-written data from the interactive whiteboard 10. Specifically, the control portion 31 transmits an obtainment request for obtainment of the board-written data to the interactive whiteboard 10, thereby causing the board-written data obtaining portion 113 of the interactive whiteboard 10 to obtain the board-written data and the board-written data transmitting portion 114 to transmit the board-written data.

<Step S23>

In step S23, the control portion 31 transmits exercise data to the terminal apparatuses 20 in response to the transmission operation received in step S17 of the page information storing process. Here, the process of step S23 is executed by the first transmission processing portion 315 of the control portion 31.

<Step S24>

In step S24, the control portion 31 associates the exercise data that was transmitted to the terminal apparatuses 20 in step S23, with the latest stored piece of board-written data in the first storage portion 351. For example, the control portion 31 associates the exercise data with the latest stored piece of board-written data by adding the associated-data information to both of the exercise data and the latest stored piece of board-written data. Here, the process of step S24 is an example of the third step of the present disclosure and is executed by the first data processing portion 316 of the control portion 31.

Specifically, when the process of step S22 has been executed, the control portion 31 associates the exercise data with the board-written data that was obtained in step S22. In addition, when the process of step S22 has not been executed, the control portion 31 associates the exercise data with a piece of board-written data that was determined in step S21 to have been stored latest in the first storage portion 351. This eliminates the need to execute a process for determining whether or not there is a common learning theme between the exercise data to be transmitted and the board-written data stored in the first storage portion 351, thereby the content of processing is simplified. It is noted that the board-written data associated with the exercise data in step S24 may be a plurality of pieces of board-written data.

<Step S25>

In step S25, the control portion 31 detects, from the first storage portion 351, similar board-written data that resembles, in content of the lesson information, the board-written data that was associated with the exercise data in step S24. For example, when one or more keywords are detected in both of a piece of board-written data that was associated with the exercise data in step S24, and another piece of board-written data which is stored in the first storage portion 351, the control portion 31 determines that the two pieces of board-written data resemble each other in content of the lesson information. Here, the process of step S25 is executed by the detection processing portion 317 of the control portion 31.

<Step S26>

In step S26, the control portion 31 associates the exercise data that was transmitted to the terminal apparatuses 20 in step S23, with exercise data that is associated with the similar board-written data detected in step S25. Here, the process of step S26 is executed by the second data processing portion 318 of the control portion 31. With this configuration, the exercise data transmitted to the terminal apparatuses 20 is associated with one or more pieces of exercise data that are stored in the second storage portion 352 whose learning theme is common to that of the transmitted exercise data.

It is noted that the process of step S23 may be executed after the process of step S26. In addition, the processes of steps S25 and S26 may be executed at a different timing from the execution of the page information storing process. For example, the processes of steps S25 and S26 may be executed in a time zone in which the processing load of the server 30 is relatively light.

Figure 5:
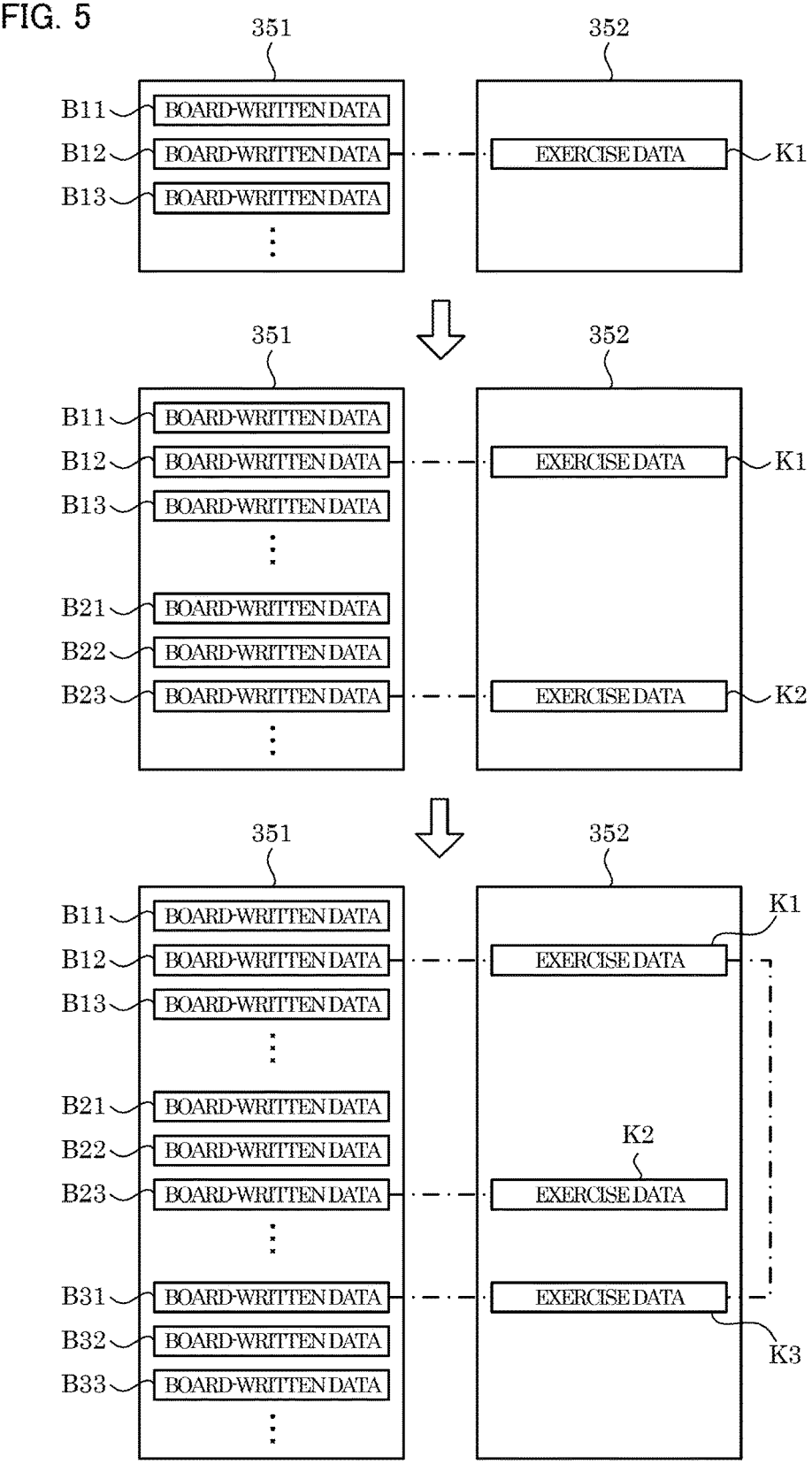
FIG. 5 is a diagram showing board-written data and exercise data stored in the server included in the information processing system according to an embodiment of the present disclosure.

Here, with reference to FIG. 5, a description is given of how exercise data is associated with board-written data and exercise data that has been associated with similar board-written data, each time the first transmission process is executed. It is noted that FIG. 5 is a diagram for explaining an example case where a lesson is conducted three times by using the information processing system 100, and each time exercise data is transmitted to the terminal apparatuses 20, the exercise data is associated with board-written data stored in the first storage portion 351 and exercise data stored in the second storage portion 352.

In FIG. 5, reference signs "B11" to "B13" respectively represent three pieces of board-written data that were obtained from the interactive whiteboard 10 and stored in the first storage portion 351 during the lesson of the first round. The reference sign "K1" represents a piece of exercise data that was transmitted to the terminal apparatuses 20 during the lesson of the first round. Reference signs "B21" to "B23" respectively represent three pieces of board-written data that were obtained from the interactive whiteboard 10 and stored in the first storage portion 351 during the lesson of the second round. The reference sign "K2" represents a piece of exercise data that was transmitted to the terminal apparatuses 20 during the lesson of the second round. Reference signs "B31" to "B33" respectively represent three pieces of board-written data that were obtained from the interactive whiteboard 10 and stored in the first storage portion 351 during the lesson of the third round. The reference sign "K3" represents a piece of exercise data that was transmitted to the terminal apparatuses 20 during the lesson of the third round. It is noted that board-written data B12 and board-written data B31 resemble each other in content of the lesson information.

First, during the lesson of the first round, after exercise data K1 stored in the second storage portion 352 is transmitted to the terminal apparatuses 20 (step S23), the exercise data K1 is associated with board-written data B12 that had been obtained from the interactive whiteboard 10 immediately before the exercise data K1 was transmitted (step S24). Subsequently, similar board-written data that resembles the board-written data B12 in content of the lesson information is detected from the first storage portion 351 (step S25). It is noted that, when the lesson of the first round is conducted, the similar board-written data that resembles the board-written data B12 in content of the lesson information has not been stored in the first storage portion 351 yet. Thus the similar board-written data is not detected. In addition, since the similar board-written data is not detected, the process of step S26 is not executed.

Next, during the lesson of the second round, after exercise data K2 stored in the second storage portion 352 is transmitted to the terminal apparatuses 20, the exercise data K2 is associated with board-written data B23 that had been obtained from the interactive whiteboard 10 immediately before the exercise data K2 was transmitted. Subsequently, similar board-written data that resembles the board-written data B23 in content of the lesson information is detected from the first storage portion 351. It is noted that, when the lesson of the second round is conducted, the similar board-written data that resembles the board-written data B23 in content of the lesson information has not been stored in the first storage portion 351 yet. Thus the similar board-written data is not detected. In addition, since the similar board-written data is not detected, the process of step S26 is not executed.

Lastly, during the lesson of the third round, after exercise data K3 stored in the second storage portion 352 is transmitted to the terminal apparatuses 20, the exercise data K3 is associated with board-written data B31 that had been obtained from the interactive whiteboard 10 immediately before the exercise data K2 was transmitted. Subsequently, the board-written data B12 is detected from the first storage portion 351 as the similar board-written data that resembles the board-written data B31 in content of the lesson information (step S25). After this, the exercise data K1 associated with the detected board-written data B12 is associated with the exercise data K3 (step S26).

As described above, in the first transmission process, exercise data stored in the second storage portion 352 is associated with other exercise data stored in the second storage portion 352, based on the resemblance in content of the lesson information between a plurality of pieces of board-written data that were associated with a plurality of pieces of exercise data respectively when the plurality of pieces of exercise data were each transmitted to the terminal apparatuses 20. As the process proceeds, exercise data associated with other exercise data having a common learning theme is accumulated in the second storage portion 352. This facilitates the students to search and find one or more pieces of exercise data whose learning theme is common to that of a piece of exercise data.

It is noted that processes of step S21, step S22, step S25 and step S26 may be omitted in the first transmission process. For example, in step S24, the control portion 31 may associate a piece of exercise data transmitted in step S23 with a plurality of pieces of board-written data in the first storage portion 351 whose learning theme is common to that of the piece of exercise data. Specifically, the control portion 31 may associate the exercise data K3 shown in FIG. 5 with the board-written data B31 and the board-written data B12. In this case, too, the board-written data B12 stored in the first storage portion 351 is associated with a plurality of pieces of exercise data K1 and K3 that have a common learning theme. As a result, it is possible to search and find, from the board-written data B12 associated with the exercise data K3 that was transmitted during a lesson, another piece of exercise data K1 that has a common learning theme.

[Board-Written Data Obtaining Process]

Figure 6:
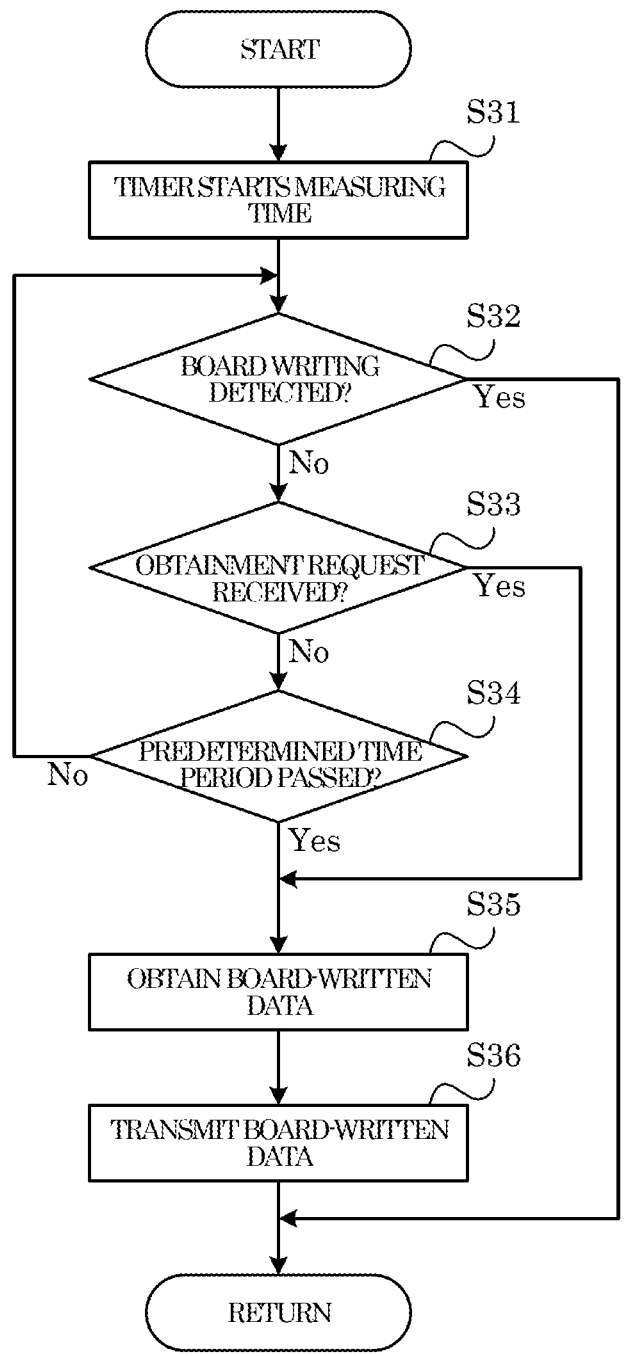
FIG. 6 is a flowchart showing an example of a board-written data obtaining process executed in the interactive whiteboard included in the information processing system according to an embodiment of the present disclosure.

Next, with reference to FIG. 6, a description is given of an example of the procedure of the board-written data obtaining process executed by the control portion 11 in the interactive whiteboard 10. It is noted that, upon receiving the first control signal transmitted from the server 30, the control portion 11 executes the board-written data obtaining process. In addition, upon receiving the second control signal transmitted from the server 30, the control portion 11 ends the board-written data obtaining process.

<Step S31>

First, in step S31, the control portion 11 causes a timer to start measuring the time.

<Step S32>

In step S32, the control portion 11 determines whether or not a board writing on the board surface 10A has been detected. That is, the control portion 11 determines whether or not the lesson information has been input to the board surface 10A. Here, the process of step S32 is executed by the board writing detecting portion 112 of the control portion 11.

Here, upon determining that a board writing on the board surface 10A has been detected (Yes side at S32), the control portion 11 resets the time measurement started in step S31 and moves the process to step S31. In addition, upon determining that a board writing on the board surface 10A has not been detected (No side at S32), the control portion 11 moves the process to step S33.

<Step S33>

In step S33, the control portion 11 determines whether or not the obtainment request that was transmitted from the server 30 executing the process of step S22 of the first transmission process, has been received.

Here, upon determining that the obtainment request has been received from the server 30 (Yes side at S33), the control portion 11 moves the process to step S35. In addition, upon determining that the obtainment request has not been received from the server 30 (No side at S33), the control portion 11 moves the process to step S34.

<Step S34>

In step S34, the control portion 11 determines whether or not a predetermined time period has passed since the start of the time measurement in step S31.

Here, upon determining that the predetermined time period has passed since the start of the time measurement in step S31 (Yes side at S34), the control portion 11 moves the process to step S35. In addition, upon determining that the predetermined time period has not passed since the start of the time measurement in step S31 (No side at S34), the control portion 11 moves the process to step S32 and waits for detection of a board writing on the board surface 10A, reception of the obtainment request, or passage of the predetermined time period.

<Step S35>

In step S35, the control portion 11 obtains, as the board-written data, the lesson information displayed on the board surface 10A. For example, the control portion 11 generates a screen shot of a display screen displayed on the board surface 10A by the display portion 12, and obtains the screen shot as the board-written data. Here, the process of step S35 is an example of the first step of the present disclosure, and is executed by the board-written data obtaining portion 113 of the control portion 11. It is noted that the control portion 11 may execute the process of step S35 when a predetermined operation is performed on the operation portion 13 even if the predetermined time period has not passed since the start of the time measurement in step S31.

<Step S36>

In step S36, the control portion 11 transmits the board-written data obtained in step S35 to the server 30. Here, the process of step S36 is executed by the board-written data transmitting portion 114 of the control portion 11.

[Page Information Obtaining Process]

Figure 7:
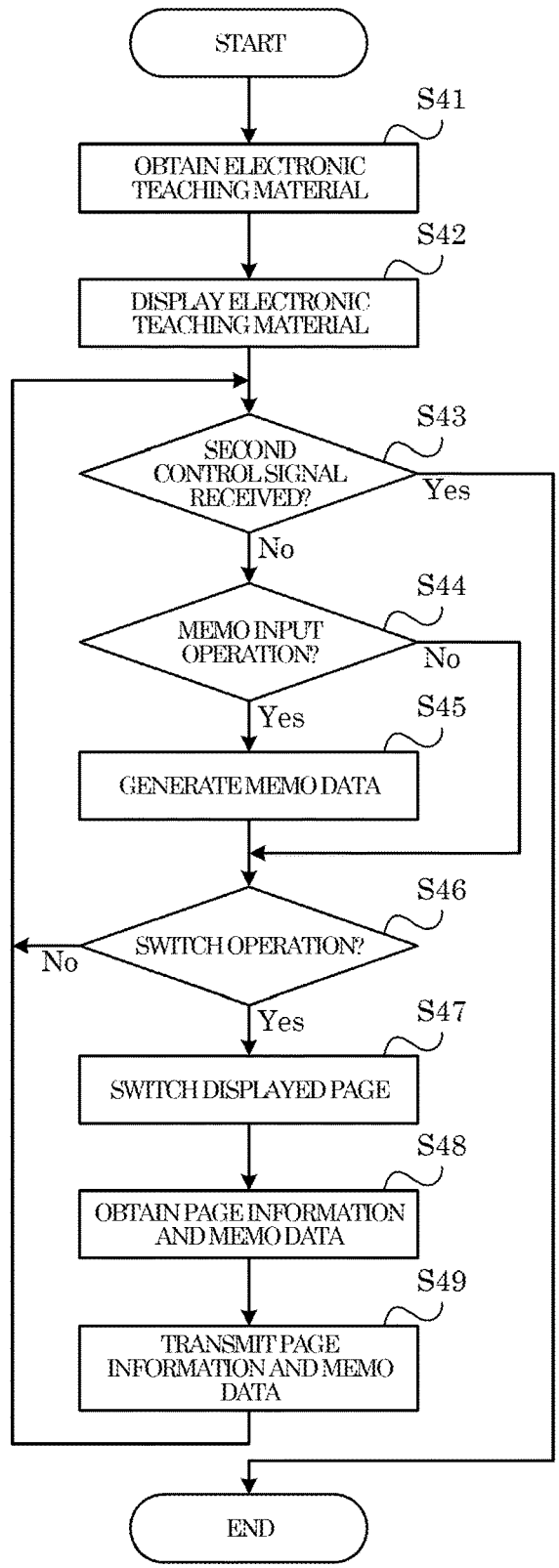
FIG. 7 is a flowchart showing an example of a page information obtaining process executed in terminal apparatuses included in the information processing system according to an embodiment of the present disclosure.

Next, with reference to FIG. 7, a description is given of an example of the procedure of the page information obtaining process executed by the CPU of the control portion 21 in the terminal apparatuses 20. It is noted that, upon receiving the first control signal transmitted from the server 30, the control portion 21 executes the page information obtaining process.

<Step S41>

First, in step S41, the control portion 21 obtains the electronic teaching material. For example, the control portion 21 causes the server 30 to transmit the electronic teaching material by transmitting, to the server 30, an instruction to transmit the electronic teaching material. The control portion 21 then receives and obtains the electronic teaching material transmitted from the server 30. Here, the process of step S41 is executed by the teaching material obtaining portion 211 of the control portion 21.

<Step S42>

In step S42, the control portion 21 displays, on the display portion 22, the electronic teaching material obtained in step S41. For example, the control portion 21 displays, on the display portion 22, a page of the electronic teaching material that has been set in the server 30 in advance. Here, the process of step S42 is executed by the first display processing portion 212 of the control portion 21.

<Step S43>

In step S43, the control portion 21 determines whether or not the second control signal has been received from the server 30.

Here, upon determining that the second control signal has been received from the server 30 (Yes side at S43), the control portion 21 ends the page information obtaining process. In addition, upon determining that the second control signal has not been received from the server 30 (No side at S43), the control portion 21 moves the process to step S44.

<Step S44>

In step S44, the control portion 21 determines whether or not a memo input operation has been performed on the page of the electronic teaching material displayed on the display portion 22. Specifically, in response to a tap operation performed on the page of the electronic teaching material displayed on the display portion 22, the control portion 21 displays, on the display portion 22, a memo input screen for performing a memo input operation. The control portion 21 determines that a memo input operation has been performed when the memo input screen has received the memo input operation.

Here, upon determining that a memo input operation has been performed (Yes side at S44), the control portion 21 moves the process to step S45. In addition, upon determining that a memo input operation has not been performed (No side at S44), the control portion 21 moves the process to step S46.

<Step S45>

In step S45, in response to the memo input operation performed in step S44, the control portion 21 generates memo data representing the memo. Here, the processes of step S44 and step S45 are executed by the memo data generating portion 213 of the control portion 21.

<Step S46>

In step S46, the control portion 21 determines whether or not a switch operation has been performed on the operation portion 23.

Here, upon determining that a switch operation has been performed on the operation portion 23 (Yes side at S46), the control portion 21 moves the process to step S47. In addition, upon determining that a switch operation has not been performed on the operation portion 23 (No side at S46), the control portion 21 moves the process to step S43, and waits for a memo input operation to be performed or a switch operation to be performed on the operation portion 23 until the second control signal is received from the server 30.

<Step S47>

In step S47, the control portion 21 switches the page of the electronic teaching material displayed on the display portion 22. Here, the process of step S47 is executed by the switch processing portion 214 of the control portion 21.

<Step S48>

In step S48, the control portion 21 obtains page information that corresponds to the page of the electronic teaching material that had been displayed before being switched in step S47. In addition, the control portion 21 obtains, together with the page information, the memo data that corresponds to the page of the electronic teaching material that had been displayed before being switched. Here, the process of step S48 is executed by the page information obtaining portion 215 of the control portion 21.

<Step S49>

In step S49, the control portion 21 transmits, to the server 30, the page information and the memo data obtained in step S48, and the identification information. Here, the process of step S49 is executed by the page information transmitting portion 216 of the control portion 21.

[Second Transmission Process]

Figure 8:
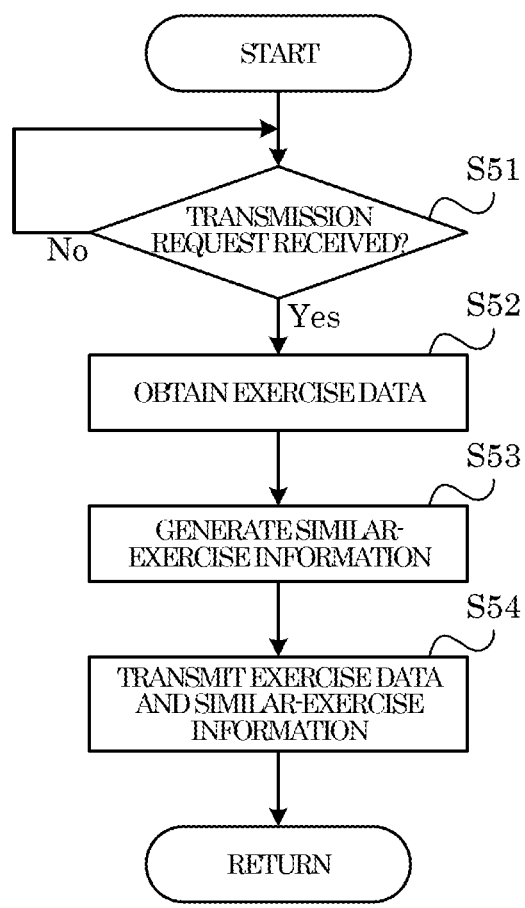
FIG. 8 is a flowchart showing an example of a second transmission process executed in the server included in the information processing system according to an embodiment of the present disclosure.

Next, with reference to FIG. 8, a description is given of an example of the procedure of the second transmission process executed by the CPU of the control portion 31 in the server 30.

<Step S51>

First, in step S51, the control portion 31 determines whether or not an exercise data transmission request transmitted from a terminal apparatus 20 has been received. For example, the transmission request is transmitted to the server 30 after a lesson is over, by a student who has taken the lesson, by operating the operation portion 23 of the terminal apparatus 20.

Here, upon determining that a transmission request has been received from a terminal apparatus 20 (Yes side at S51), the control portion 31 moves the process to step S52. In addition, upon determining that a transmission request has not been received from a terminal apparatus 20 (No side at S51), the control portion 31, in step S51, waits for a transmission request to be received from a terminal apparatus 20.

<Step S52>

In step S52, the control portion 31 obtains, by reading from the second storage portion 352, exercise data which is requested to be transmitted by the transmission request received in step S51.

<Step S53>

In step S53, the control portion 31 identifies one or more pieces of exercise data that are associated with the exercise data that was obtained in step S52, and generates similar-exercise information that indicates the identified one or more pieces of exercise data.

<Step S54>

In step S54, the control portion 31 transmits, to the terminal apparatus 20, the exercise data obtained in step S52 and the similar-exercise information generated in step S53. Here, the processes of steps S51 to S54 are executed by the second transmission processing portion 319 of the control portion 31. This allows the display portion 22 of the terminal apparatus 20 to display the transmitted exercise data and information of one or more other pieces of exercise data whose learning theme is common to that of the transmitted exercise data. As a result, the student can easily recognize the presence of one or more other pieces of exercise data whose learning theme is common to that of the transmitted exercise data.

[Lesson Information Display Process]

Figure 9:
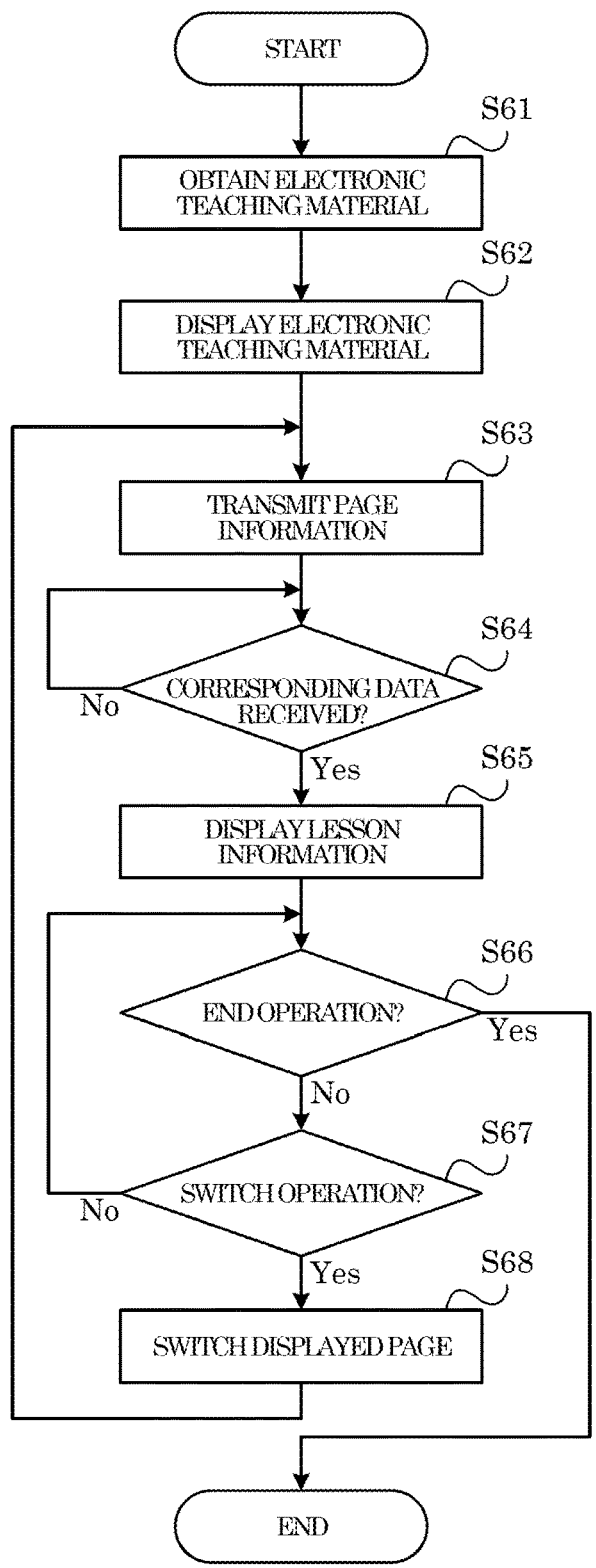
FIG. 9 is a flowchart showing an example of a lesson information display process executed in the terminal apparatuses included in the information processing system according to an embodiment of the present disclosure.

Next, with reference to FIG. 9, a description is given of an example of the procedure of the lesson information display process executed by the CPU of the control portion 21 in the terminal apparatuses 20. It is noted that the control portion 21 executes the lesson information display process when an operation for instructing an execution of the lesson information display process is performed on the operation portion 23. For example, the operation for instructing an execution of the lesson information display process is performed after the lesson ends by a student who has taken the lesson.

<Step S61>

First, in step S61, the control portion 21, as in the process of step S41 in the page information obtaining process, obtains the electronic teaching material.

<Step S62>

In step S62, the control portion 21, as in the process of step S42 in the page information obtaining process, displays, on the display portion 22, the electronic teaching material obtained in step S61.

<Step S63>

In step S63, the control portion 21 transmits, to the server 30, a transmission instruction instructing to transmit the board-written data and the memo data corresponding to the page of the electronic teaching material, together with the identification information and the page information corresponding to the page of the electronic teaching material displayed on the display portion 22. It is noted that the control portion 21 may transmit, together with those information, a transmission instruction instructing to transmit exercise data associated with the board-written data.

On the other hand, upon receiving the page information, the identification information and the transmission instruction from the terminal apparatus 20, the control portion 31 of the server 30 obtains, from the storage portion 35, board-written data and memo data that correspond to the received page information. Specifically, the control portion 31 identifies and obtains the board-written data and the memo data that correspond to the received page information, based on the page information and the data identification information that are stored in the storage portion 35 for each of the terminal apparatuses 20. The control portion 31 then transmits the obtained board-written data and memo data to the terminal apparatus 20.

<Step S64>

In step S64, the control portion 21 determines whether or not the board-written data and the memo data that correspond to the page of the electronic teaching material have been received from the server 30.

Here, upon determining that the board-written data and the memo data have been received from the server 30 (Yes side at S64), the control portion 21 moves the process to step S65. In addition, upon determining that the board-written data and the memo data have not been received from the server 30 (No side at S64), the control portion 21, in step S64, waits for the board-written data and the memo data to be received from the server 30. Here, the processes of step S63 and step S64 are executed by the corresponding data obtaining portion 217 of the control portion 21.

<Step S65>

In step S65, the control portion 21 displays the lesson information on the display portion 22 based on the board-written data received in step S64. In addition, the control portion 21 displays, together with the lesson information, the memo on the display portion 22 based on the memo data received in step S64. For example, the control portion 21 displays thumbnail images representing the lesson information and the memo on the page of the electronic teaching material displayed on the display portion 22. It is noted that, when exercise data associated with the board-written data has been received, the control portion 21 may display the exercise data on the display portion 22. Here, the process of step S65 is executed by the second display processing portion 218 of the control portion 21. With this configuration where a memo that was generated while an electronic teaching material was displayed on the display portion 22, is displayed together with lesson information, learning effects of the student who reviews the lesson by using the terminal apparatus 20 are improved.

<Step S66>

In step S66, the control portion 21 determines whether or not an operation for ending the lesson information display process was performed on the operation portion 23.

Here, upon determining that an operation for ending the lesson information display process was performed on the operation portion 23 (Yes side at S66), the control portion 21 ends the lesson information display process. In addition, upon determining that an operation for ending the lesson information display process has not been performed on the operation portion 23 (No side at S66), the control portion 21 moves the process to step S67.

<Step S67>

In step S67, the control portion 21, as in the process of step S46 in the page information obtaining process, determines whether or not a switch operation has been performed on the operation portion 23.

Here, upon determining that a switch operation has been performed on the operation portion 23 (Yes side at S67), the control portion 21 moves the process to step S68. In addition, upon determining that a switch operation has not been performed on the operation portion 23 (No side at S67), the control portion 21 moves the process to step S66, and waits for a switch operation to be performed on the operation portion 23 until an operation for ending the lesson information display process is performed.

<Step S68>

In step S68, the control portion 21, as in the process of step S47 in the page information obtaining process, switches the page of the electronic teaching material displayed on the display portion 22, in response to the switch operation determined to have been performed in step S67. Subsequently, the processes from step S63 are executed again such that the board-written data and the memo data corresponding to a page of the electronic teaching material to which the preceding page was switched in step S68 are obtained and displayed on the display portion 22.

As described above, the interactive whiteboard 10 and the server 30 include: the first storage portion 351 configured to store board-written data that includes lesson information input to the board surface 10A; the second storage portion 352 configured to store exercise data; the board-written data obtaining portion 113 configured to obtain board-written data; the first storage processing portion 312 configured to store, into the first storage portion 351, the board-written data obtained by the board-written data obtaining portion 113; the first transmission processing portion 315 configured to transmit, in response to a transmission operation, the exercise data stored in the second storage portion 352, to one or more terminal apparatuses 20; the first data processing portion 316 configured to associate the exercise data transmitted by the first transmission processing portion 315, with the board-written data that was obtained by the board-written data obtaining portion 113 during a predetermined time period until the transmission of the exercise data by the first transmission processing portion 315; the detection processing portion 317 configured to detect, from the first storage portion 351, similar board-written data that resembles, in content of the lesson information, the board-written data that has been associated with the exercise data by the first data processing portion 316; and the second data processing portion 318 configured to associate the exercise data that has been associated with the board-written data by the first data processing portion 316, with the exercise data that has been associated with the similar board-written data detected by the detection processing portion 317.

With the above-described configuration, the board-written data stored in the first storage portion 351 and the exercise data stored in the second storage portion 352 are associated with each other based on the common learning theme. In addition, a plurality of pieces of exercise data stored in the second storage portion 352 are associated with each other based on the common learning theme. As a result, when students review the lesson by using a piece of exercise data stored in the second storage portion 352 of the server 30, it is possible to reduce their trouble of detecting, from among a lot of pieces of exercise data stored in the second storage portion 352, one or more pieces of other exercise data whose learning theme is common to that of the piece of exercise data.

OTHER EMBODIMENTS

It is noted that the interactive whiteboard 10 of the information processing system 100 may not include the display portion 12, the drawing processing portion 111, and the board writing detecting portion 112. For example, the interactive whiteboard 10 may be configured such that the lesson information is input to the board surface 10A by a physical means such as a chalk. In that case, the board-written data obtaining portion 113 may cause an image reading portion such as a scanner that can read an image on the board surface 10A, to read the lesson information input to the board surface 10A provided on the interactive whiteboard 10, and obtain the board-written data.

The present disclosure may be recognized as an invention of an information processing system 100 that includes the interactive whiteboard 10, one or more terminal apparatuses 20, and the server 30. In addition, the information processing system 100 may include a terminal for teacher configured to transmit, to the server 30, the exercise data and an instruction for transmitting the exercise data to the terminal apparatuses 20.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a first storage portion configured to store one or more pieces of board-written data which each includes lesson information that was input to a board surface;
a second storage portion configured to store one or more pieces of exercise data;
a board-written data obtaining portion configured to obtain a piece of board-written data;
a storage processing portion configured to store, in the first storage portion, the piece of board-written data obtained by the board-written data obtaining portion;
a first data processing portion configured to associate the piece of board-written data stored in the first storage portion by the storage processing portion, with a piece of exercise data whose learning theme is common to a learning theme of lesson information included in the piece of board-written data;
a detection processing portion configured to detect, from among the one or more pieces of board-written data stored in the first storage portion, a piece of similar board-written data that resembles, in content of lesson information, the piece of board-written data that has been associated with the piece of exercise data by the first data processing portion;
a second data processing portion configured to associate the piece of exercise data that has been associated with the piece of board-written data by the first data processing portion, with another piece of exercise data that has been associated with the piece of similar board-written data detected by the detection processing portion; and
a first transmission processing portion configured to transmit, in response to a predetermined transmission operation, a piece of exercise data stored in the second storage portion, to one or more terminal apparatuses, wherein
the first data processing portion associates the piece of exercise data transmitted by the first transmission processing portion, with a piece of board-written data that was obtained by the board-written data obtaining portion during a predetermined time period until a transmission of the piece of exercise data by the first transmission processing portion.

2. The information processing apparatus according to claim 1, wherein
when one or more keywords are detected in common in both of the piece of board-written data that has been associated with the piece of exercise data by the first data processing portion, and another piece of board-written data that is stored in the first storage portion, the detection processing portion determines that the piece of board-written data and the other piece of board-written data resemble each other in content of lesson information, one or more keywords having been assigned to each of a plurality of learning themes in advance.

3. The information processing apparatus according to claim 1 further comprising:
a second transmission processing portion configured to transmit a piece of exercise data to a terminal apparatus in response to a transmission request from the terminal apparatus, and transmit, to the terminal apparatus, similar-exercise information that indicates one or more pieces of exercise data whose learning theme is common to a learning theme of the transmitted piece of exercise data.

4. The information processing apparatus according to claim 1 further comprising:
a board writing detecting portion configured to detect whether or not there is board writing on the board surface, wherein
the board-written data obtaining portion obtains, as a piece of board-written data, a piece of lesson information that has been input to the board surface, each time a predetermined time passes after the board writing detecting portion detected absence of board writing.

5. An information processing method performed in an information processing apparatus which includes a first storage portion and a second storage portion, the first storage portion being configured to store one or more pieces of board-written data which each includes lesson information that was input to a board surface, the second storage portion being configured to store one or more pieces of exercise data, the information processing method comprising:
a first step of obtaining a piece of board-written data;
a second step of storing, in the first storage portion, the piece of board-written data obtained in the first step;
a third step of associating the piece of board-written data stored in the first storage portion in the second step, with a piece of exercise data whose learning theme is common to a learning theme of lesson information included in the piece of board-written data;
a fourth step of detecting, from among the one or more pieces of board-written data stored in the first storage portion, a piece of similar board-written data that resembles, in content of lesson information, the piece of board-written data that has been associated with the piece of exercise data by the third step;
a fifth step of associating the piece of exercise data that has been associated with the piece of board-written data by the third step, with another piece of exercise data that has been associated with the piece of similar board-written data detected by the fourth step; and
a sixth step of transmitting, in response to a predetermined transmission operation, a piece of exercise data stored in the second storage portion, to one or more terminal apparatuses, wherein
the third step associates the piece of exercise data transmitted by the sixth step, with a piece of board-written data that was obtained by the first step during a predetermined time period until a transmission of the piece of exercise data by the sixth step.

* * * * *